G. M. ALLERTON.
Improvement in Waterproof Baskets.
No. 132,428.    Patented Oct. 22, 1872.
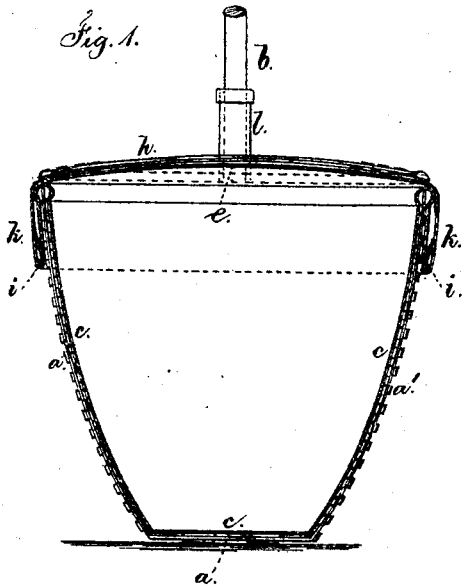
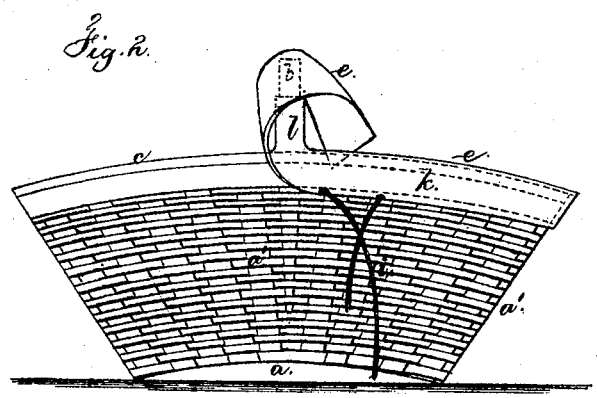
INVENTOR
George M. Allerton,
Per Lemuel W. Serrell
ATTY.
Witnesses.
Chas. H. Smith
Geo. D. Walker

UNITED STATES PATENT OFFICE.

GEORGE M. ALLERTON, OF DOVER PLAINS, NEW YORK, ASSIGNOR TO GOODYEAR'S INDIA-RUBBER GLOVE MANUFACTURING COMPANY, OF NAUGATUCK, CONNECTICUT.

IMPROVEMENT IN WATER-PROOF BASKETS.

Specification forming part of Letters Patent No. 132,428, dated October 22, 1872.

*To all whom it may concern:*

Be it known that I, GEORGE M. ALLERTON, of Dover Plains, in the county of Dutchess and State of New York, have invented an Improvement in Water-Proof Baskets, and the following is declared to be a correct description thereof.

This invention is for adapting a basket to holding substances that require to be protected from moisture, and also for holding liquid substances, and that without increasing the weight of the basket to any considerable extent. I make use of a basket of willow, chip, metal, or any suitable material interwoven, of the desired size and shape, and apply a lining of India-rubber cloth, and also employ a cover of the same material, attached by a strap or cord. A basket made in this way is adapted to carrying provisions for a journey, keeping them from moisture or from atmospheric action, and the basket can also be used as a bucket for water or liquid material, thereby adapting the one article to many uses, especially with travelers and parties residing in country places.

In the drawing, Figure 1 is a vertical section of the basket complete, and Fig. 2 is an exterior view with the cover turned back over the handle.

The basket is made with the bottom $a$ of open-work, of wood or other suitable material, and of the required size and shape. The handle $b$ is attached to the sides $a'$ of the basket. Within this basket is a lining of India-rubber cloth, $c$, attached at the upper edges to the edges of the basket, so as to render the basket water-proof, or adapted to retain liquids, or to protect the contents from atmospheric influences or moisture. The cover $e$ of the basket is made of India-rubber cloth with double rim $k$, within which is a strap or cord, $i$, that can be tightened around the top of the basket to confine the contents by keeping the cover firmly in place upon the basket. These covers may be used on baskets that do not have any handle, but are lined, as aforesaid.

My device is a new article of manufacture, adapted to use under circumstances where an ordinary basket could not be employed.

In Fig. 2 the flexible rubber cover only is shown; in Fig. 1 the rubber cover $e$ is shown on the inside of a wicker cover, $h$. In both instances there are sleeves $l$ of rubber attached to the cover $e$ for the handle to pass through to keep water from running in at these points.

I claim as my invention—

1. The basket with a lining and cover of India-rubber cloth, constructed and applied in the manner set forth.

2. The India-rubber cover $e$, with the rim $k$, and sleeves $l$ for the handle, in combination with the basket, substantially as set forth.

Signed by me this 22d day of May, A. D. 1872.

GEO. M. ALLERTON.

Witnesses:
GEO. T. PINCKNEY,
CHAS. H. SMITH.